ns Patent [19]

Yunan

[11] 4,014,826
[45] Mar. 29, 1977

[54] PROCESS FOR PREPARING REBONDED FOAM STRUCTURES
[75] Inventor: Malak E. Yunan, Boonton Township, N.J.
[73] Assignee: E. I. Du Pont de Nemours and Company, Wilmington, Del.
[22] Filed: Mar. 13, 1975
[21] Appl. No.: 558,020

Related U.S. Application Data

[62] Division of Ser. No. 452,568, March 19, 1974, Pat. No. 3,894,973.
[52] U.S. Cl. .................. 260/2.5 AK; 260/2.5 B; 260/2.5 BE; 260/2.5 F; 260/2.5 H; 260/2.5 HA; 260/2.5 HB; 260/2.5 N; 260/3
[51] Int. Cl.² .................. C08G 18/14; C08J 9/22
[58] Field of Search ............ 260/2.5 AK, 2.5 BE, 260/2.5 B, 2.5 H, 2.5 HA, 2.5 HB, 2.5 F, 2.5 N

[56] References Cited
UNITED STATES PATENTS

| 3,114,722 | 12/1963 | Einhorn et al. | 260/2.5 AK |
| 3,227,664 | 1/1966 | Blades et al. | 264/118 |
| 3,256,218 | 6/1966 | Knox | 260/2.5 AK |
| 3,401,128 | 9/1968 | Terry | 260/2.5 AK |
| 3,582,500 | 6/1971 | Carriere et al. | 260/2.5 BE |

FOREIGN PATENTS OR APPLICATIONS 997,334  7/1965  United Kingdom ......... 260/2.5 AK Primary Examiner—H.S. Cockeram

[57] ABSTRACT

A process of preparing rebonded structures from a composition which includes both particulate elastomeric foam and pneumacel fibers.

1 Claim, No Drawings

PROCESS FOR PREPARING REBONDED FOAM STRUCTURES

BACKGROUND OF THE INVENTION

In the manufacture of cushioning structures of elastomeric foam, a syrup or compounded latex comprising the elastomeric-foam progenitors is cured in a mold under conditions which result in "blowing" and curing. Subsequent cutting into the various shapes and sizes required results in the formation of scrap, i.e., pieces too small to have utility per se. It is known to recover such scrap by shredding, wetting with a fluid curable to an elastomeric binder, and remolding the mass under conditions to cure the binder to yield a unitary foam structure which has useful properties, albeit somewhat different from those of the original foam.

Typical of the prior art are U.S. Pat. Nos. 3,114,722, 3,300,421 and 3,401,128. Essentially these describe coating comminuted polyurethane foam particles with a bonding agent comprising a prepolymer of polyurethane — the reaction product of a polyhydroxy compound with a polyisocyanate — and hastening the bonding process by placing the shredded polyurethane foam and prepolymer in a mold, wherein the prepolymer forms a coating around the particles of shredded material, applying heat and pressure, and recovering a molded article. Such a product is commonly referred to as a "rebonded" structure. It is improved in load-support characteristics over the original, which the cushioning trade regards as a substantial advantage; but it is somewhat higher in density than the original foam from which the shreds were obtained. This is a disadvantage. It still resembles the original (e.g., polyurethane) foam, however, in that although capable of bearing a somewhat greater load at a given degree of compression, it will, nonetheless, "bottom out" with moderate further loading, thus losing its cushioning characteristics.

Cushioning structures are also prepared from very low density cellular fibers which have excellent pneumatic properties. In general, these so-called pneumacel fibers are made from synthetic organic polymers and are composed predominately of small, polyhedral-shaped, closed cells, the cells being defined by thin, film-like walls of polymer. Gases contained within the cells contribute to the stiffness and pneumatic behavior of the cellular fibers. Such fibers have densities of 0.01 g./cc. or less and, due to their pressurized, pneumatic character, are noncompliant, "springy" structures. If held under compression, pneumacel will lose part of its trapped gas, but when the pressure is released it will reabsorb air and reinflate to its original size.

These fibers, in batt form, are useful as cushioning layers in mattresses, auto upholstery, or upholstered furniture for thermal insulation, or for carpet cushion underlays. Such batts are formed typically by depositing the fibers as a loose uniform batt on a continuous belt, impregnating them with a thermoplastic binder in the form of a latex, drying, heating to activate the binder, compression, and cooling before release from compression to set the batt in its compressed form. Other additives such as fire-retardants, dyes, etc. may also be applied to the batting. Some of the numerous patents on this general subject are U.S. Pat. Nos. 3,375,211; 3,375,212; 3,503,907; 3,485,711; 3,535,181; 3,743,694; 3,717,904 and 3,730,916.

Suitable pneumacel fibers are prepared from synthetic crystallizable, organic polymers, and as described in U.S. Pat No. 3,227,664, include polyhydrocarbons such as linear polyethylene, stereoregular polypropylene or polystyrene; polyethers such as polyformaldehyde; vinyl polymers such as poly(vinylidene fluoride); polyamides, both aliphatic and aromatic, such as poly(hexamethylene adipamide) and poly(metaphenylene adipamide) and poly(metaphenylene isophthalamide); polyurethanes, both aliphatic and aromatic, such as the polymer from ethylene bischloroformate and ethylene diamine; polyesters such as poly(hydroxypivalic acid) and poly(ethylene terephthalate); copolymers such as poly(ethylene terephthalate isophthalate), and the like. The polymers are of at least film-forming molecular weight. Preferably, the pneumacel fibers are made of poly(ethylene terephthalate), inflated with Freon.

The processing of pneumacel batting, manufactured as described above, into cushioning structures of the desired shapes and sizes usually requires trimming off edges, corners and the like, which trimmings are hereafter referred to as scrap pneumacel batting.

SUMMARY OF THE INVENTION

It has now been found that rebonded structures of polyurethane foam can be upgraded considerably by the addition of pneumacel fibers to the molding composition. More particularly, the instant process is directed to the steps of (1) shredding or otherwise subdividing pneumacel batting into substantially single-fiber dimensions, (2) mixing from 1–50 parts by weight of such fibers with 99–50 parts by weight of shredded elastomeric foam, for example polyurethane foam, (3) wetting the mixture with 5–50 parts by weight of elastomeric binder progenitor, and (4) curing the mixture under conditions which result in conversion of the progenitor into an adhesive, thereby bonding the mixture into a unitary, elastomeric structure.

The process is particularly advantageous insofar as it provides a practical utility for scrap pneumacel batting as well as for scrap foam. A surprising feature is that incorporation of pneumacel fibers into the process for manufacture of "rebond" elastomeric foam within the above-stated limits results not only in a desirable decrease in density of the structure, but also in a product of improved cushioning characteristics. In other words, the final product is improved over that without pneumacel both in load-to-compress and density. Pneumacel will not "bottom out" under a reasonable load such as encountered in mattress padding and carpeting backing, whereas polyurethane foams will. It has been recognized that rebond foam is firmer than the original foam from which the scrap is derived. Since a firmer texture is highly desirable for certain luxury cushioning, the still greater firmness with pneumacel fibers within the prescribed limits materially increases the value of the cushioning. The product feels like dense rubber and has a soft "hand." Incorporation of less than the prescribed amount of pneumacel results in no appreciable increase in firmness. Use of more than the prescribed amount leads to excessive firmness and limited utility for the composite structure.

The invention will readily be understood by reference to the following Examples, in which parts are by weight, and which are illustrative of the general procedure of this invention.

EXAMPLE I

About 6.4 g. of polyurethane foam sheets are cut into approximately one quarter inch cubes. About 6.4 g. of pneumacel sheet is shredded into essentially separate fibers having a length of one half inch or less. The two particulate materials are slurried in a neoprene latex which has been diluted with water to 10% solids content. The latex is drained away; the wet mixture is then squeezed gently to remove excess latex, and dumped into a foraminous mold which is 12 inches in both horizontal dimensions and 1 inch high. The mold is closed, placed in an oven maintained at 120° C. for 2 hours, removed and allowed to cool. The resulting one inch thick composite cushion comprises 2 oz. per square yard of both pneumacel and polyurethane chips and 3 oz. per square yard of neoprene binder. It is useful as cushioning over springs.

EXAMPLE II

Polyurethane foam segments having a density of about 0.03 g./cc. were shredded to a particle-size average of about 0.3 cm. Likewise, segments of a pneumacel batt poly(ethylene terephthalate) were shredded to substantially single filaments, averaging about 0.3 cm. in length. Eighty-five parts of the polyurethane foam segments and 15 parts of the pneumacel fibers were mixed thoroughly, wetted by 10 parts of a polyurethane binder progenitor, specifically a polyurethane syrup containing no blowing agent, and pressed into a batch mold. The mold and contents were heated by steam to cure the binder and then cooled.

A compression cushion was prepared in the same way except that 100 parts of the polyurethane shreds and no pneumacel fibers were used. The pneumacel composite cushion had a density of 3.3 lb./ft.$^3$ vs. 6.0 lb./ft.$^3$ for the all-polyurethane comparison cushion. In a test designed to compare firmness, or resistance to bottoming under load, the ratios of loads supported at 65% and 25% compression were determined for the two cushions. The pneumacel composite had a ratio of 7.2, while the allpolyurethane comparison had a ratio of 5.2.

While illustrated only as applied to preparation of rebond composites of pneumacel and polyurethane foam, the invention is equally applicable to the preparation of rebond composite structures comprising pneumacel with other shredded foams such as neoprene, natural rubber, and synthetic rubber.

Having thus described the invention, what is claimed as new and desired to be secured by Letters Patent is:

1. The process of preparing a molded cushioning structure which comprises the steps of:
    a. shredding or otherwise subdividing pneumacel batting into particles of substantially single-fiber dimensions,
    b. mixing 1–50 parts by weight of the subdivided pneumacel batting of step (a) with 99–50 parts by weight of shredded elastomeric foam,
    c. wetting the resulting mixture with from 5–50 parts by weight of elastomeric binder progenitor, and
    d. curing the mixture resulting from steps (a) through (c) under conditions which result in conversion of the progenitor into an elastomeric adhesive, thereby bonding the mixture into a unitary elastomeric structure.

* * * * *